(No Model.)

E. THOMSON.
FORMING, BRAZING, AND WELDING OF METALS BY ELECTRICITY.

No. 396,009. Patented Jan. 8, 1889.

WITNESSES:
Gabriel J. W. Galster
Wm. H. Capel

INVENTOR
Elihu Thomson
BY
Townsend & MacArthur
ATTORNEYS

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

FORMING, BRAZING, AND WELDING OF METALS BY ELECTRICITY.

SPECIFICATION forming part of Letters Patent No. 396,009, dated January 8, 1889.

Application filed February 21, 1887. Serial No. 228,277. (No model.)

*To all whom it may concern:*

Be it known that I, ELIHU THOMSON, a citizen of the United States, and a resident of Lynn, in the county of Essex and State of Massachusetts, have invented certain new and useful Improvements in Forming, Brazing, and Welding of Metals, of which the following is a specification.

My invention relates to apparatus for use in those metal-working operations in which heavy electric currents are passed through the work for the purpose of raising the same to the desired working temperature.

My invention affords a simple means whereby pieces of metal may be formed into any desired shape by the application of suitable dies, rollers, or other tools while such pieces are heated by the passage of an electric current of large volume, and also affords a simple means of practicing the welding process of my prior patent, No. 347,140.

My invention consists, essentially, in the combination of two rotary chucks or holders insulated from one another by any proper means and provided with suitable connecting-cables or other electric connecting devices, whereby an electric current may be passed through the metal pieces in the chucks or holders. By properly insulating one of the chucks of an ordinary lathe an apparatus is produced which may be used for the purposes of my invention.

My invention consists, also, in the combination, with any suitable means for holding and rotating the metal to be operated upon, of suitable connecting devices for passing heavy electric currents through the same and means for imparting the lateral pressure of die or forming surfaces to the rotating metal.

My invention consists, also, in a die or roller for use in electric metal-working operations having surfaces faced with carbon, soapstone, or other non-conductor of heat of a refractory nature.

Further combinations and devices forming a part of my invention will be more particularly specified in the claims after being described in connection with the accompanying drawings, in which—

Figure 3:
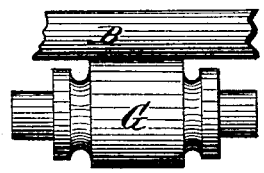
Figure 4:
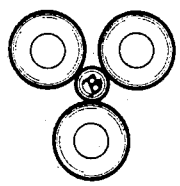
Figure 1:
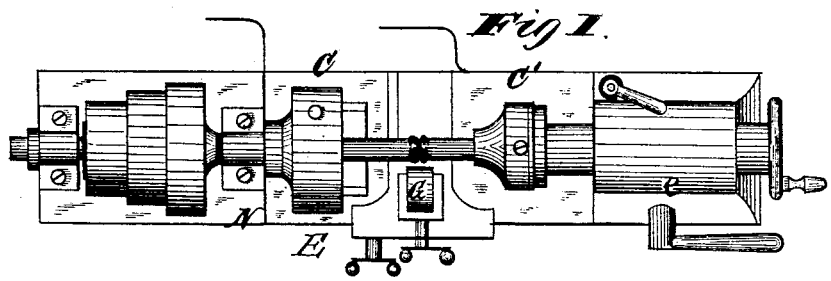
Figure 2:
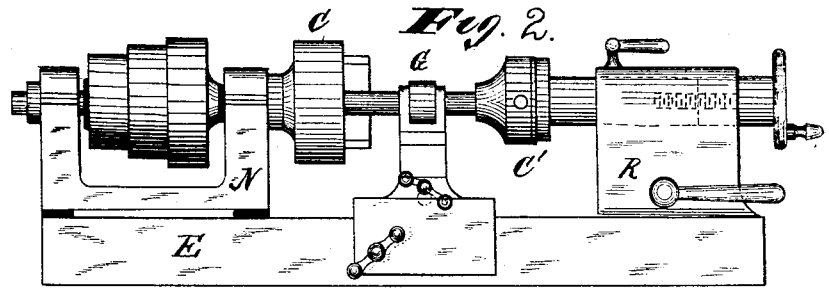
Figure 5:
Figure 6:

Figure 1 is a plan, and Fig. 2 a side elevation, of a lathe adapted to the practice of my invention, so far as it relates to the forming of metal bars or pieces and to the welding of bars or pieces by butt-welding. Figs. 3, 5, and 6 show various applications of my invention. Fig. 4 illustrates a modification in the manner of applying the forming-dies, rollers, or surfaces.

In Figs. 1 and 2 an ordinary lathe is shown modified by insulating the pulley-head N from the bed or shears, so as to insulate the two chucks from one another. Means, as a very heavy cable, are used to convey current thereto. The bed and back head, R, are connected to the other cable from the source of current. Chucks are provided, as C C′, to center and hold in line various-sized bars for welding by current passed from one to the other head through the abutted ends of the bars, in accordance with prior inventions in electric welding, set out, for instance, in the prior patent, before referred to. In this operation the requisite pressure can obviously be imparted to the work by moving the back head by the usual or similar means. After such welding is accomplished the lathe-chuck C may be revolved, and C′ (mounted so as to be free to turn) is carried around also. A roller or die, G, may now be forced against the work at the weld to form its outer surface; or a tool, as a cutting-tool, may be applied in obvious manner to turn off the expansion left by the welding.

The die or roller G can be carried by the tool-post of the lathe. I use such a lathe or machine in a similar way to form or shape bars of metal held in the chucks, and through which bars currents are passed to heat them, so as to give shape to the bars, as may be needed. Thus in Fig. 3 a roller G, pressed against the heated bar B, will give its form to the exterior surface of the bar B, but reversed, as in Fig. 5. To get good effects it is best to apply three rolls pressed against the bar, as in Fig. 4, instead of one only. It is well, also, to permit the end movement of the bar, as it lengthens during the process. The heat is kept up while the bar revolves by the current sent through it, and the rolls, Fig. 4, are arranged to be drawn away from the bar to permit such heating.

Fig. 6 shows an instance of the production of a form on the end of a bar. This is done by holding the bar in C, Figs. 1 and 2, with a sufficient length projecting and abutting against a block of metal carried by the back head, R. The current is passed and heats the projecting end of the bar, and the subsequent application of three rolls of proper form, as in Fig. 4, completes the work.

It is best to face the die-surfaces of the dies or rolls with carbon, soapstone, or other non-conductor of heat of a refractory nature.

What I claim as my invention is—

1. In a machine for shaping, forming, and welding metals, means for holding and rotating the metal to be operated upon, connections to pass heavy electric currents through the same, and means for imparting the lateral pressure of die-surfaces to the rotating metal, as and for the purpose described.

2. In an electric metal-working apparatus, die or forming-surfaces faced with a non-conductor of heat of a refractory nature.

3. In an electric metal-working apparatus, rotary chucks or holders mounted on a suitable frame, but insulated from one another, and suitable means for passing heavy electric currents to the work in said holders.

4. A lathe having its chucks or holders insulated from one another, in combination with means for passing heavy electric currents through the metal mounted on the lathe.

5. In an electric metal-working apparatus, the combination of two rotary chucks or holders insulated from one another and means connected with one of said chucks for moving it to and from the other chuck after the manner of the back head of a lathe.

6. The combination, with suitable holders for rotating a metal piece and suitable connections for passing a heavy electric current through the same, of one or more lateral die-rolls, as and for the purpose described.

Signed at Lynn, in the county of Essex and State of Massachusetts, this 18th day of February, A. D. 1887.

ELIHU THOMSON.

Witnesses:
E. WILBUR RICE, Jr.,
J. W. GIBBONEY.